United States Patent [19]

Goris

[11] Patent Number: 5,535,981
[45] Date of Patent: Jul. 16, 1996

[54] ADJUSTABLE CASTING MOLD

[76] Inventor: Richard L. Goris, Rte. #1 Box 1711, LaBelle, Fla. 33935

[21] Appl. No.: 339,802

[22] Filed: Nov. 15, 1994

[51] Int. Cl.$^6$ ............................. B28B 7/02; B29C 33/22
[52] U.S. Cl. ......................... 249/157; 249/34; 249/155; 249/158; 249/163; 249/164; 249/166
[58] Field of Search ................................ 249/155, 166, 249/34, 163, 164, 158, 157

[56] References Cited

U.S. PATENT DOCUMENTS

| | | | |
|---|---|---|---|
| 1,504,580 | 8/1924 | Rowe | 249/157 |
| 1,678,266 | 7/1928 | Niestradt | 249/157 |
| 2,240,195 | 6/1940 | Steinmetz | 249/158 |
| 3,964,727 | 6/1976 | Gladwin | 249/158 |
| 4,506,724 | 3/1985 | Vial | 165/436 |
| 4,557,315 | 12/1985 | Vanbel et al. | 164/420 |
| 5,225,214 | 7/1993 | Fillion | 249/131 |
| 5,238,394 | 8/1993 | Hirata | 425/590 |
| 5,421,544 | 6/1995 | Roop | 249/163 |

FOREIGN PATENT DOCUMENTS

| | | | |
|---|---|---|---|
| 62-39212 | 2/1987 | Japan | 249/155 |
| WO94/15045 | 7/1994 | WIPO | 249/34 |

*Primary Examiner*—Jan H. Silbaugh
*Assistant Examiner*—Vi Duong Dang
*Attorney, Agent, or Firm*—William E. Noonan

[57] ABSTRACT

A new and improved adjustable casting mold including a mold base having a generally rectangular configuration. Included in the device is a fixed mold form having a generally L-shaped configuration. The fixed mold form is integral with the mold base offset from a center portion thereof. Also included in the device is an adjustable mold form having a generally L-shaped configuration. The adjustable mold form is positionable on the mold base and positioned against the fixed mold form. The adjustable mold form is positioned against the fixed mold form to create a casting area. A clamp assembly is removably positioned against the adjustable mold form and the fixed mold form. The clamp assembly is secured thereto by two washers and two wing nuts. The clamp assembly serves to secure the adjustable mold form to the fixed mold form.

4 Claims, 4 Drawing Sheets

ADJUSTABLE CASTING MOLD

BACKGROUND OF THE INVENTION

1. Field of the Invention

The present invention relates to an adjustable casting mold and more particularly pertains to enabling the encapsulation of specimens in almost any size within its range of movement with an adjustable casting mold.

2. Description of the Prior Art

The use of casting molds is known in the prior art. More specifically, casting molds heretofore devised and utilized for the purpose of casting materials are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,238,394 to Hirata discloses a mold clamping apparatus for molding apparatus.

U.S. Pat. No. 5,225,214 to Filion discloses a laterally adjustable divider wall for molding two color shells.

U.S. Pat. No. 4,557,315 to Vaubel et al. discloses an adjustable continuous casting mold arrangement.

U.S. Pat. No. 4,506,724 to Vial discloses an ingot mold with adjustable dimensions for a continuous casting machine.

U.S. Pat. No. 3,964,727 to Gladwin discloses an adjustable width continuous casting mold.

While these devices fulfill their respective, particular objective and requirements, the aforementioned patents do not describe an adjustable casting mold for enabling the encapsulation of specimens in almost any size within its range of movement.

In this respect, the adjustable casting mold according to the present invention substantially departs from the conventional concepts and designs of the prior art, and in doing so provides an apparatus primarily developed for the purpose of enabling the encapsulation of specimens in almost any size within its range of movement.

Therefore, it can be appreciated that there exists a continuing need for new and improved adjustable casting mold which can be used for enabling the encapsulation of specimens in almost any size within its range of movement. In this regard, the present invention substantially fulfills this need.

SUMMARY OF THE INVENTION

In the view of the foregoing disadvantages inherent in the known types of casting molds now present in the prior art, the present invention provides an improved adjustable casting mold. As such, the general purpose of the present invention, which will be described subsequently in greater detail, is to provide a new and improved adjustable casting mold and method which has all the advantages of the prior art and none of the disadvantages.

To attain this, the present invention essentially comprises a mold base having a generally rectangular configuration. The mold base has an upper surface and a lower surface. The lower surface has a plurality of apertures formed therein. The device contains a fixed mold form having a generally L-shaped configuration. The fixed mold form has a longer extent and a shorter extent. The longer extent and the shorter extent have an inner surface and an outer surface. The shorter extent has an aperture formed therethrough. The fixed mold is integral with the upper surface of the mold base offset from a center portion thereof. The device contains an adjustable mold form having a generally L-shaped configuration. The adjustable mold form has a longer extent and a shorter extent. The longer extent and the shorter extent have an inner surface and an outer surface. The adjustable mold form is positionable on the upper surface of the mold base with the inner surface of the longer extent positioned against the shorter extent of the fixed mold form and the shorter extent positioned against the inner surface of the longer extent of the fixed mold form. The adjustable mold form is positioned against the fixed mold form to create a casting area. The device contains a clamp assembly having a first extent and a second extent. The first extent has two long screws secured thereto on end portions thereof. The second extent has two apertures formed therethrough on end portions thereof. The apertures align with the two long screws for coupling therewith. The clamp assembly is removably positioned against the outer surface of the longer extent of the adjustable mold form and the outer surface of the fixed mold form. The clamp assembly is secured thereto by two washers and two wing nuts. The clamp assembly serves to secure the adjustable mold form to the fixed mold form. The device contains a plurality of rubber foot pads. Each of the rubber foot pads is coupled with the plurality of apertures formed in the lower surface of the mold base. The plurality of rubber foot pads serve to prevent the device from sliding on a flat surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable casting mold which has all the advantages of the prior art casting molds and none of the disadvantages.

It is another object of the present invention to provide a new and improved adjustable casting mold which may be easily and efficiently manufactured and marketed.

It is a further object of the present invention to provide a new and improved adjustable casting mold which is of durable and reliable construction.

An even further object of the present invention is to provide a new and improved adjustable casting mold which is susceptible of a low cost of manufacture with regard to both materials and labor, and which accordingly is then susceptible of low prices of sale to the consuming public, thereby making such an adjustable casting mold economically available to the buying public.

Still yet another object of the present invention is to provide a new and improved adjustable casting mold which provides in the apparatuses and methods of the prior art some of the advantages thereof, while simultaneously overcoming some of the disadvantages normally associated therewith.

Even still another object of the present invention is to provide a new and improved adjustable casting mold for enabling the encapsulation of specimens in almost any size within its range of movement.

Lastly, it is an object of the present invention to provide a new and improved adjustable casting mold comprising a mold base having a generally rectangular configuration. Included in the device is a fixed mold form having a generally L-shaped configuration. The fixed mold form is integral with the mold base offset from a center portion thereof. Also included in the device is an adjustable mold form having a generally L-shaped configuration. The adjustable mold form is positionable on the mold base and positioned against the fixed mold form. The adjustable mold form is positioned against the fixed mold form to create a casting area. A clamp assembly is removably positioned against the adjustable mold form and the fixed mold form. The clamp assembly is secured thereto by two washers and two wing nuts. The clamp assembly serves to secure the adjustable mold form to the fixed mold form.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
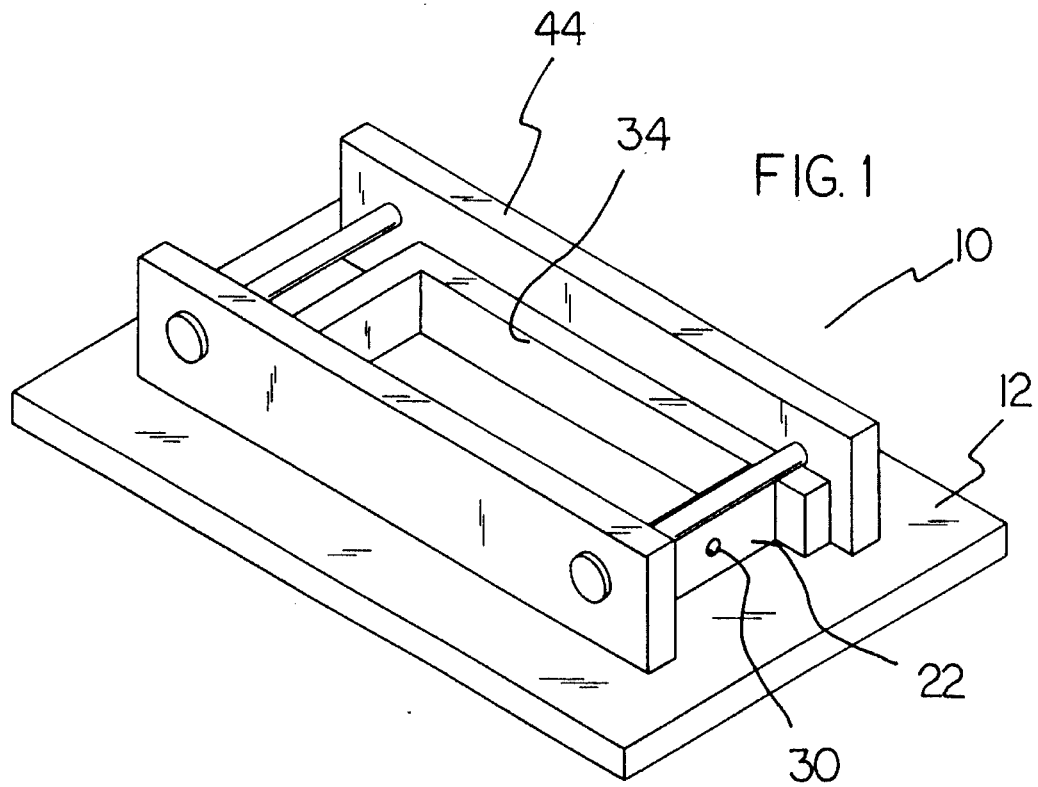
FIG. 1 is a perspective view of the preferred embodiment of the adjustable casting mold constructed in accordance with the principles of the present invention.
Figure 2:
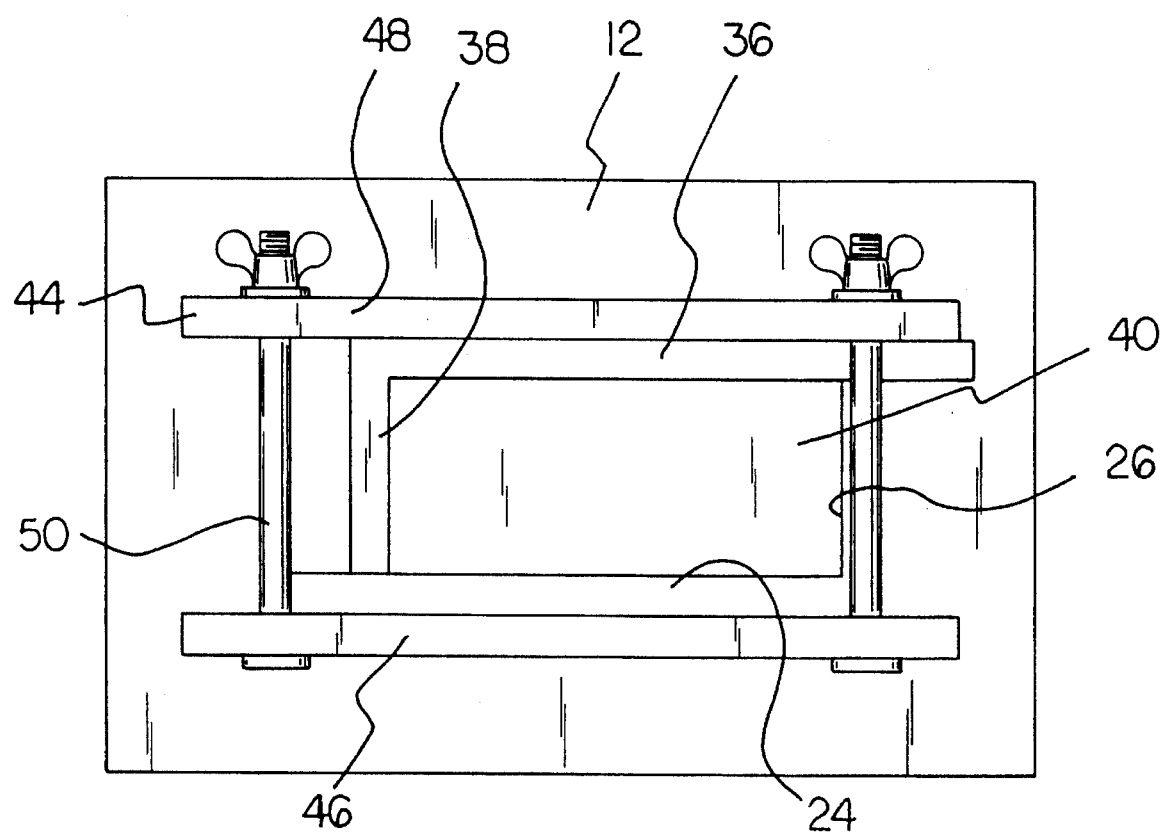
FIG. 2 is a plan view of the present invention in a fully assembled configuration.
Figure 3:
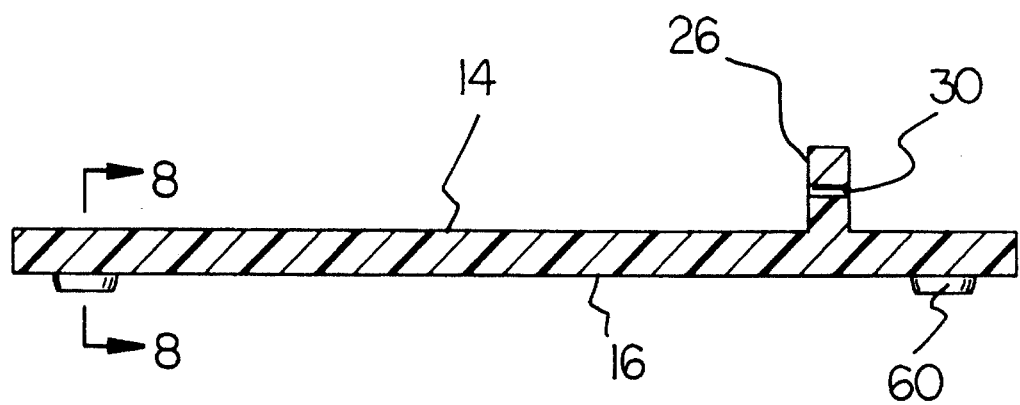
FIG. 3 is a cross-sectional view of the base and fixed mold form.
Figure 4:
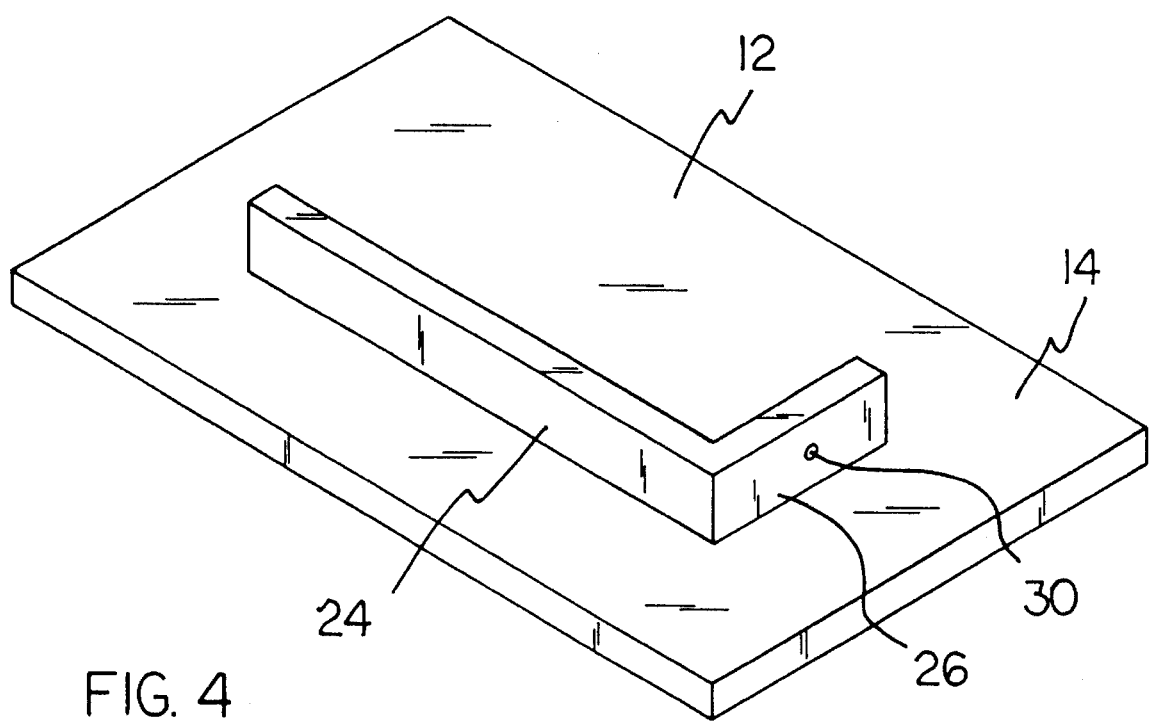
FIG. 4 is a perspective view of the present invention.
Figure 5:
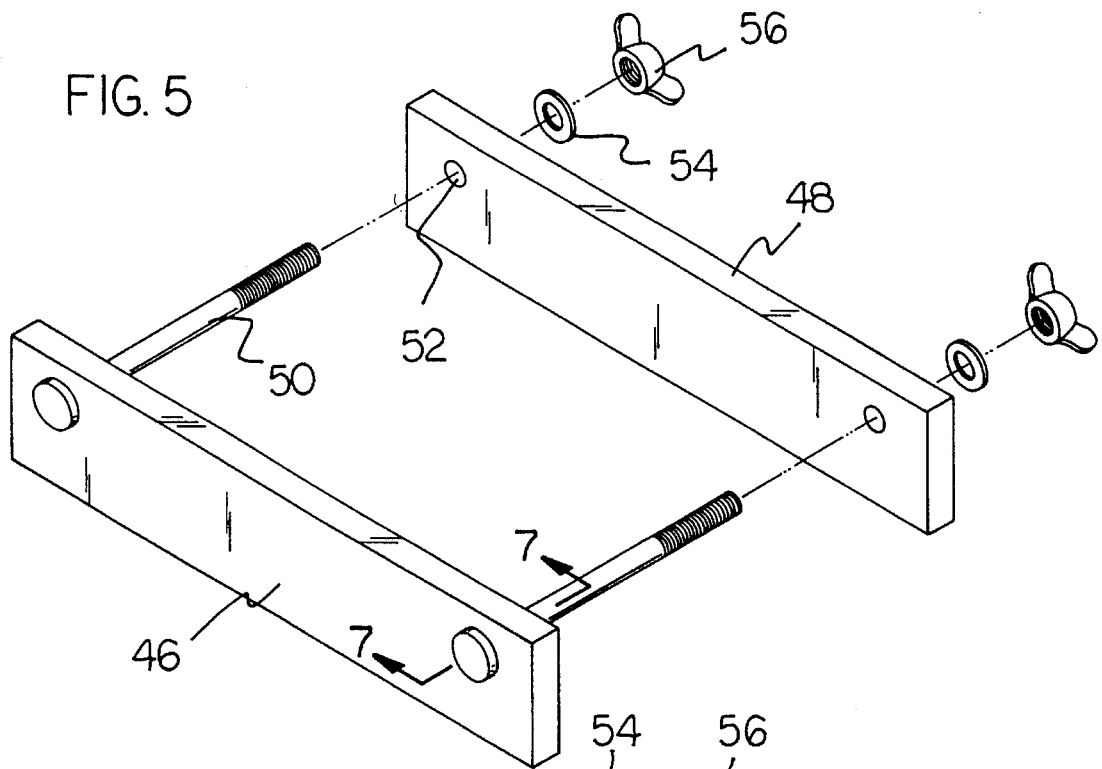
FIG. 5 is a perspective view of the clamp assembly of the present invention.
Figure 6:
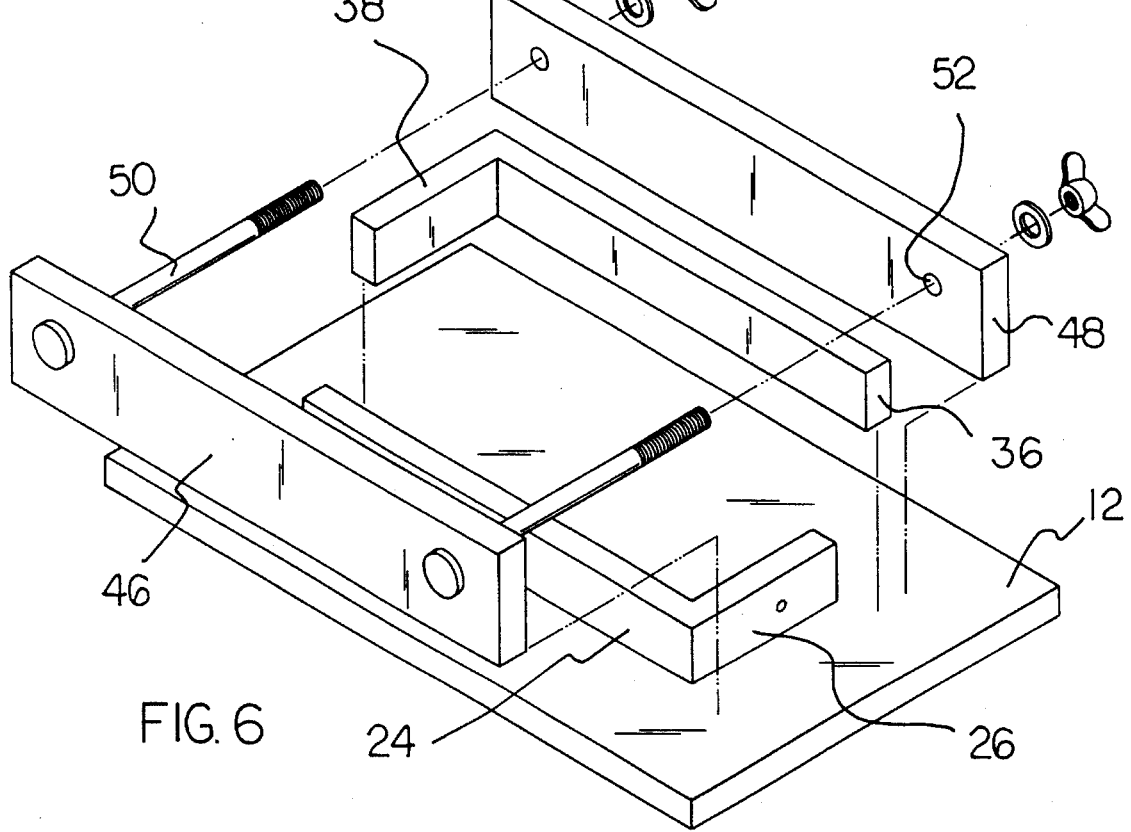
FIG. 6 is an exploded perspective view of the present invention.
Figure 7:
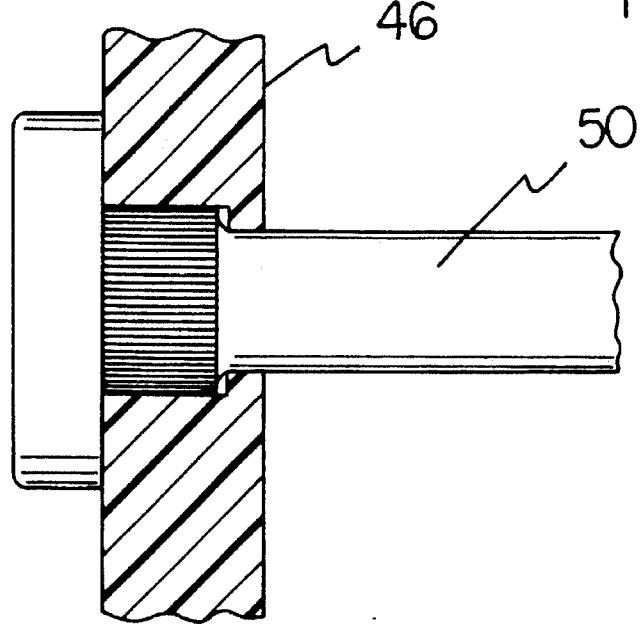
FIG. 7 is a cross-sectional view as taken along line 7—7 of FIG. 5.
Figure 8:
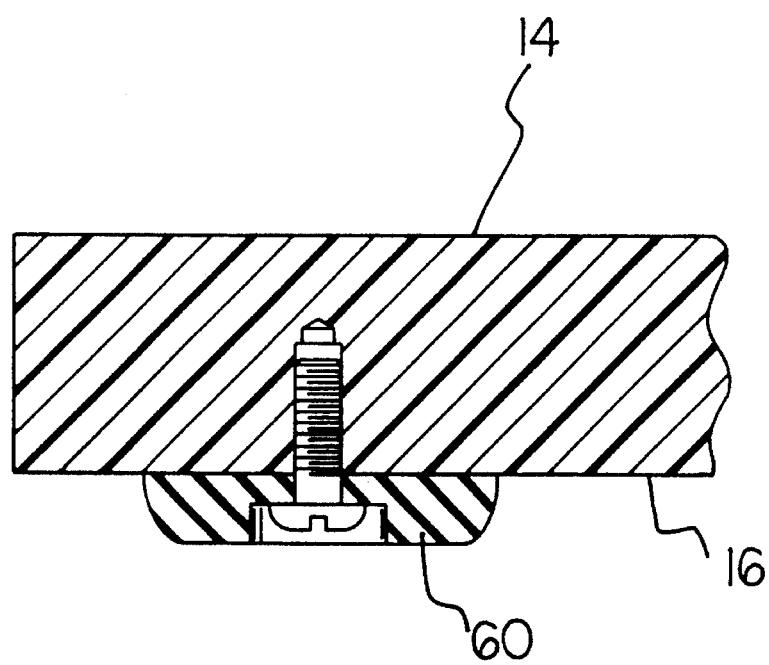
FIG. 8 is a cross-sectional view as taken along line 8—8 of FIG. 3.

With reference now to the drawings, and in particular, to FIG. 1 thereof, the preferred embodiment of the new and improved adjustable casting mold embodying the principles and concepts of the present invention and generally designated by the reference number 10 will be described.

Specifically, it will be noted in the various Figures that the device relates to a new and improved adjustable casting mold for enabling the encapsulation of specimens in almost any size within its range of movement. In its broadest context, the device consists of a mold base, a fixed mold form, an adjustable mold form, a clamp assembly, and a plurality of rubber foot pads.

The device 10 contains a mold base 12 having a generally rectangular configuration. The mold base 12 has an upper surface 14 and a lower surface 16. The lower surface 16 has a plurality of apertures formed therein. The mold base 12 is preferably fabricated of a rigid plastic material.

The device 10 contains a fixed mold 22 form having a generally L-shaped configuration. The fixed mold 22 form has a longer extent 24 and a shorter extent 26. The shorter extent 26 is perpendicular to the longer extent 24. The longer extent 24 and the shorter extent 26 have an inner surface and an outer surface. The shorter extent 26 has an aperture 30 formed therethrough. The aperture 30 allows an eye hook to be cast into a mold through the aperture 30. The fixed mold 20 is integral with the upper surface 14 of the mold base 12 offset from a center portion thereof. The fixed mold 22 is positioned in a corner of the mold base 12.

The device 10 contains an adjustable mold form 34 having a generally L-shaped configuration. The adjustable mold form 34 has a longer extent 36 and a shorter extent 38. The shorter extent 38 is perpendicular to the longer extent 36. The longer extent 36 and the shorter extent 38 have an inner surface and an outer surface. The adjustable mold form 34 is positionable on the upper surface 14 of the mold base 12 with the inner surface of the longer extent 36 positioned against the shorter extent 26 of the fixed mold form 22 and the shorter extent 38 positioned against the inner surface of the longer extent 24 of the fixed mold form 22. The adjustable mold form 34 is positioned against the fixed mold form 22 to create a casting area 40. The casting area 40 can be increased or decreased in size depending on the size of the specimen to be encapsulated. The casting area 40 will decrease as the shorter extent 38 is positioned closer to the shorter extent 26 of the fixed mold form 22. The casting area 40 will increase when the shorter extent 38 is positioned further away from the shorter extent 26 of the fixed mold form 22.

The device 10 contains a clamp assembly 44 having a first extent 46 and a second extent 48. The first extent 46 has two long screws 50 secured thereto on end portions thereof. The second extent 48 has two apertures 52 formed therethrough on end portions thereof. The apertures 52 align with the two long screws 50 for coupling therewith. The clamp assembly 44 is removably positioned against the outer surface of the longer extent 36 of the adjustable mold form 34 and the outer surface of the longer extent 24 of the fixed mold form 22. The clamp assembly 44 is secured thereto by two washers 54 and two wing nuts 56. The clamp assembly 44 serves to secure the adjustable mold form 34 to the fixed mold form 22. The two wing nuts 56 are simply loosened or tightened for the clamp assembly 44 to secure the adjustable mold form 34 in place or to remove the adjustable mold form 34. When the clamp assembly 44 is in place, molding can begin within the casting area 40.

The device 10 contains a plurality of rubber foot pads 60. Each of the rubber foot pads 60 is coupled with the plurality of apertures formed in the lower surface 16 of the mold base 12. The plurality of rubber foot pads 60 serve to prevent the device 10 from sliding on a flat surface. The preferred amount of rubber foot pads 60 is four positioned in four corners of the lower surface 16 of the mold base 12.

The present invention is a mold with a flexible design that enables the encapsulation of specimens in almost any size within its range of movement.

The present invention is fabricated from plastic, wood, hardware, and a starter set of supplies for making the castings. The kit consists of a mold base 12, a fixed mold form 22, an adjustable mold form 34, a clamp 44, a resin kit, stirring sticks, mold release, paintbrushes, mixing cups, and a basic set of instructions. The base 12 and the fixed form 22 are assembled as one piece, with the form being L-shaped and located toward one corner. The adjustable form 34, which is also L-shaped, can be positioned anywhere along the edges of the fixed form 22. It is secured in place with the clamp 44.

To use the kit for encapsulating an insect, for example, the form is assembled to accommodate its size with a proportional border on each side. Then the clamp 44 is tightened around the forms 22,34. Using a suitable sealant, the seams in the mold are filled to prevent leaks. The actual casting begins by coating the mold with mold release and allowing it to dry. Then the mold is filled with the resin halfway and allowed to cure. The specimen is placed on the cured resin, and more resin is poured to fill the mold cavity.

The present invention eases the task of encapsulating specimens of different sizes. By utilizing the optional key chain slot, key chains can be made using the same mold. People who enjoy preserving various items are almost certain to appreciate the advantages of this advantage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An adjustable casting mold comprising:

a mold base that includes upper and lower surfaces;

a fixed mold form having a generally L-shaped configuration and being fixedly attached to said upper surface of said mold base, said fixed mold form having a longer extent and a shorter extent, each of which directly engages said upper surface of said mold base along a respective side edge, said longer extent having an inner surface and an outer surface;

an adjustable mold form having a generally L-shaped configuration, said adjustable mold form including a longer extent and a shorter extent, said longer and shorter extents of said adjustable mold form having respective inner and outer surfaces, said adjustable mold form being positionable on said upper surface of said mold base with said inner surface of said longer extent of said adjustable mold form being movably engaged with said shorter extent of said fixed mold form and said shorter extent of said adjustable mold form being movably engaged with said inner surface of said longer extent of said fixed mold form to create a fully enclosed, four sided casting area; and a clamp assembly separate and distinct from and removably positioned against said adjustable mold form and said fixed mold form and including a first extent that is removably positioned against said outer surface of said longer extent of said adjustable mold form, a second extent that is removably positioned against said outer surface of said longer extent of said fixed mold form and means for interconnecting said first and second extents and means for selectively drawing the first and second extents toward each other to secure the adjustable mold form against the fixed mold form.

2. The apparatus of claim 1 in which said shorter extent of said fixed mold form has an aperture formed therethrough, said aperture extending generally parallel to said upper surface of said mold base.

3. The apparatus of claim 1 in which said mold base has a generally rectangular configuration and said fixed mold is offset from a center portion of said mold base.

4. The apparatus of claim 1 in which a plurality of foot pads are attached to said lower surface of said mold base to prevent said apparatus from sliding on a flat surface.

* * * * *